United States Patent Office 2,959,547
Patented Nov. 8, 1960

2,959,547

AQUEOUS COOLANT FOR METAL WORKING MACHINES

Donald D. Brillhart, Bedford, Ohio, assignor to Ray S. Pyle

No Drawing. Filed Jan. 31, 1957, Ser. No. 637,360

8 Claims. (Cl. 252—33.6)

This invention relates, as indicated, to an improved cooling composition particularly adapted for use in metal working machines. More particularly, this invention relates to an aqueous composition containing in solution several ingredients conferring upon the composition properties making it especially useful for use as a coolant, lubricant, rust inhibitor, etc., and at the same time overcoming weaknesses in available products.

The so-called "soluble oils," widely used as coolants in metal working operations, e.g., forming, grinding, sawing, cutting, milling, drawing, extruding, etc. are aqueous emulsions of a mineral oil and water. Special ingredients are contained in these compositions which improve the lubricity, the extreme pressure lubricating characteristics, the corrosion and rust resistant properties, etc., and which characterize currently available oils. A problem with these oils is in their adverse effect upon the skin of machine operators. The mineral oil constituents of these cooling compounds under the conditions of operation tend to oxidize rather easily, introducing ingredients which are irritating to the skin and which frequently cause severe allergic reactions. The disintegration of the compounds lead to the formation of insoluble materials which accumulate in the pump and lines ordinarily used for circulating the coolant and the result is, in many cases, unsatisfactory. These soluble oil coolants, based upon mineral oil constituents, also tend to develop objectionable odor.

There has been, therefore, a need for a cooling compound which obviates many of these difficulties, and it seemed that an answer might be found in the development of a cooling composition which was actually an aqueous solution as distinguished from an emulsion. It is a principal object of this invention, therefore, to provide a water based coolant for metal working machines which is an aqueous solution of non-oil nature.

Another object of this invention is to provide an aqueous coolant which is improved in respect of bacterially promoted and/or chemically caused odor, gum-forming tendency, irritation of the skin, clarity and ash content.

Another object is to provide lubricity in a true water solution, as distinguished from an oil emulsion.

Another object is to provide such an aqueous coolant which is not subject to attack by, or a suitable medium for, the growth of bacteria.

Another object is to provide in certain specific cases, an ashless water-soluble coolant.

Still other objects of this invention will appear as the description proceeds.

It has been found that cooling compositions of a high degree of efficiency are obtained with aqueous solutions of certain water-soluble salts of high molecular weight, monohydric alcohol half esters of an aromatic dibasic acid. More particularly, the principal active ingredient in these cooling compounds is believed to have a general formula as follows:

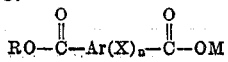

wherein R is an aliphatic radical containing at least 8 carbon atoms and not more than one ethylenic linkage, Ar is an aromatic nucleus, X is halogen attached to said aromatic nucleus, $n$ is 1 to 4 and M is a salt-forming group. A further characteristic of these compounds is that they are soluble in an aqueous medium to the extent of at least about 5% by weight. Although in certain instances the salt-forming radical M may be sodium potassium or lithium, it is evident that where it is desired to produce ashless compounds, these salt-forming groups cannot be used. Thus, ammonia and certain ammonia derivatives are used where ashless materials are sought in accordance with this invention. The active ingredient above described is desirably present in solution in an aqueous medium to the extent of from about 1% to about 15% by weight.

In certain other instances, it is desirable to further improve the basic cooling composition by the inclusion of up to about 25%, and in certain instances up to about 50%, by weight of a free water-soluble alkylolamine. The alkylolamines have a general formula $H_{3-x}N(ROH)_x$ in which R is an alkyl group containing from 2 to 3 carbon atoms, and $x$ is 1, 2 or 3. Thus, for example, R may be ethylene, propylene, or isopropylene. Specific examples of alkylolamines which may be used in accordance with this invention as a salt-forming ammonia derivative and/or the free alkylolamine desirably included in certain instances are as follows: monoethanolamine, diethanolamine, triethanolamine, mixtures of mono-, di-, and tri-ethanolamine, mono-propanolamine, dipropanolamine, tripropanolamine, mixtures of the propanolamines, monoisopropanolamine, di-isopropanolamine, tri-isopropanolamine, and mixtures of isopropanolamines.

In still more preferred embodiments of the invention, it has been found desirable to include a water-soluble salt of a relatively high molecular weight monohydric aliphatic alcohol ester of a dibasic cycloaliphatic acid, e.g., hexahydrophthalic acid. For convenience, the esterifying alcohol and the salt-forming agent for the cycloaliphatic derivative may be the same alcohol and salt-forming agent as used in the formation of the principal active ingredient in the compositions of this invention. These agents improve the lubricity of the composition and may be used in addition to or as a replacement for part or all of the principal active ingredient as above described. Most usually, these water-soluble cycloaliphatic salt-esters are present in amounts ranging from about 2% to about 8% of the entire composition by weight. When the derivatives of the cycloaliphatic dibasic acids are used as a complete replacement for the principal active ingredient, the products are especially useful as water-soluble non-corrosive hydraulic fluids.

Many other ingredients may be included in these compositions in relatively minor amounts to confer certain desirable properties on the ultimate material. In order to improve the stability of the composition, it is desirable to include a small amount of a sequestering agent and/or wetting agent. In certain instances, for example, the water used to dilute the concentrate form in which the products of this invention are conveniently commercially handled, contains calcium or magnesium hardness. The sequestering agent stabilizes against precipitation of the active ingredients as insoluble salts. To improve odor, small amounts of pine oil may be included, and to improve the foaming properties of the composition to reduce the tendency to foam, the well known anti-foaming agents, particularly the polydimethyl silicone oils of the general formula $(-(CH_3)_2SiO-)_n$. These materials are generally used in amounts less than about 0.02%.

It becomes convenient at this point to illustrate a preferred embodiment of this invention and to give specific examples of other embodiments. It is to be understood that these examples are merely for the purpose of illustrating the invention and are not to be construed as limiting the invention to the precise scope thereof since variations from the proportions given in these examples can be made readily without substantially altering the nature of the end product and within the over-all ranges for the several ingredients herein specified.

*Example 1*

In the manufacture of these materials on a commercial scale, the salt esters herein described and their equivalents, may be made in situ. However, if it is desired, the several ingredients herein disclosed may be compounded individually and externally of the final composition and ultimately blended to give a cooling compound a coolant of this invention.

The following is a specific commercial example of a coolant of this invention.

|  | Lbs. |
|---|---|
| (1) Commercial oleyl alcohol | 43.8 |
| (2) Tetrachlorophthalic anhydride | 22.8 |
| (3) Hexahydrophthalic anhydride | 17.2 |
| (4) Triethanolamine (commercial mixture) | 248.3 |
| (5) Water | 665.2 |
| (6) Ethylenediamine tetra-acetic acid | 0.47 |
| (7) Pine oil | 0.49 |
| (8) Pine needle oil | 0.49 |
| (9) Polydimethyl siloxane (emulsion) | 0.47 |
| (10) Octyl phenyl polyethylene oxide alcohol (9 EtO groups) | 0.77 |

Ingredients 6–10 are beneficial in commercial use, but not essential. This group, or groups of equivalent agents, will be referred to collectively as "Modifier Composition."

The alcohol, which is a monohydric aliphatic alcohol containing an average of 18 carbon atoms per molecule and having an iodine number of 70–80, is placed in an iron kettle and heated to 95–100° C. The aromatic acid anhydride is then added in bulk and the mixture stirred for .5 hr. during which time the temperature is increased to about 145° C. Thereafter, the cycloaliphatic dibasic acid anhydride is added as a liquid, having been previously warmed in a separate container, and in an amount preferably slightly in excess of that required to convert all of the alcohol remaining in the composition to the mono-acid ester after reaction with the aromatic dibasic acid anhydride. After the esterification reaction is complete, the reaction mass is allowed to cool to 95° C. spontaneously.

When the temperature has reached 95° C., the alkylolamine, in this case the triethanolamine, with the exception of about 4 lb. withheld for neutralizing the sequestering agent, is then added to the mass containing the acid-esters. The temperature is kept low, preferably below about 99° C. in order to avoid amide formation. The water is then added. Thereafter the alkylamine neutralized sequestering agent and the other ingredients are added and stirred into the composition. The product is then ready for druming. The product may be used as it comes from the drum or diluted still further with water as may be desired.

*Example 2*

A product similar to that of Example 1 may be prepared by admixing into an aqueous solution the following ingredients in the amounts indicated:

|  | Lbs. |
|---|---|
| Triethanolamine salt of mono-oleyl tetrachlorophthalate | 56 |
| Triethanolamine salt of mono-oleyl hexahydrophthalate | 48 |
| Triethanolamine | 220 |
| Water | 665 |
| Triethanolamine salt of ethylenediamine tetra-acetic acid | .56 |
| Pine oil | .5 |
| Pine needle oil | .5 |
| Polydimethyl silicone (emulsion) | .5 |
| Alkylaryl polyether alcohol (Triton X–100) | .8 |

*Example 3*

An example of a cooling composition which is also useful is one containing the same ingredients as listed in Example 2 above, omitting, however, the last five ingredients.

*Example 4*

|  | Lbs. |
|---|---|
| Di-isopropanolamine salt of the mono-octenyl alcohol ester of dichlorophthalic acid | 15 |
| Tri-isopropanolamine | 19 |
| Water | 65 |
| Tri-isopropanolamine salt of ethylenediamine tetra-acetic acid | 1 |

*Example 5*

|  | Percent |
|---|---|
| Tris(hydroxy methyl) amino methane salt of mono-(2-ethyl hexyl) tetrachlorophthalate | 5 |
| Tris(hydroxy methyl) amino methane salt of mono-(2-ethyl hexyl) hexa-hydrophthalate | 5 |
| Triethanolamine | 20 |
| Water | 69 |
| Triethanolamine salt of ethylenediamine tetra-acetic acid | .05 |
| Pine oil | .25 |
| Polydimethyl siloxane | .05 |
| Octyl phenyl polyethylene oxide alcohol | .70 |

*Example 6*

|  | Percent |
|---|---|
| Triethanolamine salt of mono-palmitoleyl mono-ester of tetrachlorophthalic acid | 10 |
| Water | 90 |

*Example 7*

|  | Percent |
|---|---|
| Triethanolamine salt of mono-cosyl tetrachlorophthalate | 10 |
| Water | 70 |
| Triethanolamine | 20 |

*Example 8*

|  | Percent |
|---|---|
| Sodium mono-oleyl tetrachlorophthalate | 12 |
| Water | 80 |
| Triethanolamine | 6 |
| Triethanolamine salt of ethylenediamine tetra-acetic acid | 1 |
| Alkylaryl polyether alcohol | 1 |

*Example 9*

A coolant in accordance with this invention may be made using the same composition as given in Example 8 above, utilizing the potassium salt in lieu of the sodium salt.

*Example 10*

A composition in accordance with this invention may be made using the same composition as given in Example 8 utilizing the lithium salt in lieu of the sodium salt.

*Example 11*

A composition in accordance with this invention may be made using the same composition as in Example 8, utilizing the ammonium salt in lieu of the sodium salt.

*Example 12*

|  | Percent |
|---|---|
| Triethanolamine salt of mono-oleyl tetrachlorophthalate | 1 |
| Triethanolamine salt of mono-oleyl hexahydrophthalate | 1 |
| Water | 98 |

Example 13

| | Percent |
|---|---|
| Triethanolamine salt of mono-oleyl tetrachlorophthalate | 8 |
| Triethanolamine salt of mono-oleyl hexahydrophthalate | 8 |
| Water | 84 |

Example 14

| | Percent |
|---|---|
| Triethanolamine salt of mono-oleyl tetrachlorophthalate | 8 |
| Triethanolamine salt of mono-oleyl hexahydrophthalate | 8 |
| Triethanolamine | 20 |
| Water | 64 |

Example 15

| | Percent |
|---|---|
| Triethanolamine salt of mono-oleyl tetrachloroisophthalate | 15 |
| Water | 85 |

Example 16

| | Percent |
|---|---|
| Triethanolamine salt of mono-oleyl hexahydrophthalate | 10 |
| Water | 90 |

From the foregoing examples, it will be observed that the coolants of this invention comprise an aqueous solution of a compound having the general formula:

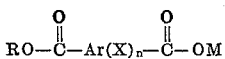

$$RO-\overset{O}{\underset{\|}{C}}-Ar(X)_n-\overset{O}{\underset{\|}{C}}-OM$$

In these compounds, R is an aliphatic radical containing at least 8 carbon atoms and not more than 1 ethylenic linkage. Ar is an aromatic nucleus, preferably containing 6 carbon atoms. Although chlorine has been exemplified as the halogen attached to the aromatic nucleus, it is obvious that the other halogens, e.g., bromine, iodine and less desirably fluorine, may be used in lieu of chlorine. Chlorine is the most practical and hence appears in the foregoing examples. An example illustrating the use of another halogen is as follows:

Example 17

| | Percent |
|---|---|
| Triethanolamine salt of mono-oleyl tetrabromophthalate | 5.6 |
| Triethanolamine salt of mono-oleyl hexahydrophthalate | 4.8 |
| Triethanolamine | 22 |
| Water | 66.5 |
| Wetting and sequestering agents | 1.1 |

Equivalent results are obtained when the halogen is attached in the aliphatic group in addition to or in lieu of the halogen attached to the aromatic nucleus. Thus, the triethanolamine salt of mono - (dichlorostearyl) phthalic anhydride, for example, may be used in place of any of the tetra halo phthalates mentioned in Examples 1–15 above in like amounts.

The compositions of this invention may be formulated, as previously indicated, either by an in situ reaction wherein the several ingredients are admixed and caused to react, or the several active ingredients may be separately compounded and later admixed in an aqueous medium to provide these compositions. The aliphatic alcohols which may be used, may be either saturated or unsaturated, or a mixture of both. They should contain from 8 to 24 carbon atoms, and may contain other substituents in the molecule. For example, the alcohols which may be used in accordance with this invention to form the mono-esters of the dibasic cyclic acids include capryl alcohol, 2-ethyl hexyl alcohol, decyl alcohol, lauryl alcohol, acetyl alcohol, stearyl alcohol, dichlorostearyl alcohol, dihydroxy stearyl alcohol, cosyl alcohol, oleyl alcohol, cosenyl alcohol, mono methyl ethers of polyethylene or polypropylene oxide alcohols in which the number of alkylene oxide groups is from 3 to 30, e.g. $CH_3-O-C_3H_6-O-C_3H_6-O-C_3H_6-OH$; decenyl alcohol, delta 9, 10-tetradecenyl alcohol, delta 15, 16-tetracosenyl alcohol, and other saturated or mono-unsaturated alcohols derived from fatty oils or produced synthetically.

With respect to the aromatic dibasic acid, perhaps the most readily available of these is phthalic acid as the acid or the anhydride. The mono, di, tri, and tetrachlorophthalic acid or anhydride or a mixture of the mono, di, tri and tertachloroacids may be used. Instead of the orthophthalic acid, the iso and terephthalic acid isomers and the corresponding halogenated derivatives may be used.

The half-acid ester of the foregoing dibasic aromatic acid and one or more of the above mentioned $C_8-C_{24}$ aliphatic alcohols may be made by conventional procedures, such as illustrated in Example 1, for example.

Thereafter, the ester is converted to a water-soluble salt with one of the several soluble salt-forming agents previously mentioned.

When it is desired, the composition may also contain a proportion of a similar salt of a cycloaliphatic disbasic acid such as hexahydrophthalic acid or an isomeric form of this dibasic acid. It has been found convenient when using an aromatic dibasic acid in combination with a cycloaliphatic disbasic acid that the esterifying alcohol and the water solubilizing salt-forming agent be the same for both acids. Of course this is not an essential requirement since if the salts are prepared separately, quite obviously different esterifying and salt-forming groups can be employed. Mixtures of the esterifying alcohols and/or mixtures of the water solubilizing alkalis and organic bases may be used if desired.

The compositions of this invention are used in the conventional manner as a coolant for metal grinding machines, lathes, drawing and die forming machines, etc., wherever coolants and lubricants are used. It has also been found that these water-soluble compositions are excellent non-flammable, hydraulic fluids. These materials have a low viscosity and are readily pumped through existing equipment. Compositions containing the variety of ingredients of such as, for example, appearing in Example 1, are substantially free from foaming, unpleasant odor, gum-forming tendency, tendency to irritate the skin, etc. These compositions are transparent and, due to the halogen content, possess anti-weld or extreme pressure lubricating characteristics. With the exception of those examples where metallic ions are used as the salt-forming radical, these compositions are ash-free. Other ingredients may be included, for example, color imparting agents, and the like in small amounts, e.g., less than about 1%.

I claim:

1. A coolant for metal working machines consisting essentially of aqueous solution of from about 1% to about 15% by weight of a water soluble compound having the general formula:

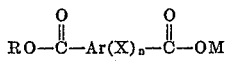

$$RO-\overset{O}{\underset{\|}{C}}-Ar(X)_n-\overset{O}{\underset{\|}{C}}-OM$$

wherein R is an aliphatic radical containing at least 8 carbon atoms and not more than one ethylenic linkage, Ar is a benzene nucleus, X is halogen attached to said benzene nucleus, n is 1 to 4, and M is a salt forming group of the class consisting of alkali metals, ammonia and amines, said salt being soluble in the aqueous medium to the extent of at least about 5% by weight.

2. A coolant for metal working machines consisting essentially of an aqueous solution of from about 1 percent to about 15 percent by weight of a water-soluble alkylolamine salt-ester of a polychlorophthalic acid and an aliphatic alcohol containing from about 16 to about 24 carbon atoms as an average, and said alcohol having an iodine number of from about 70 to about 80.

3. A coolant for metal working machines consisting essentially of an aqueous solution of from about 1 percent to about 15 percent by weight of a mixture of alkylolamine water-soluble salt-esters of polychlorophthalic acid and hexahydrophthalic acid, the esterifying alcohol for each acid being a monohydric aliphatic alcohol containing from about 16 to about 24 carbon atoms as an average and having an iodine number of from about 70 to about 80, and at least 2 percent by weight a free water soluble alkylolamine in said aqueous solution.

4. A coolant for metal working machines consisting essentially of an aqueous solution of from about 1 percent to about 15 percent by weight of a mixture of triethanolamine water-soluble salt-esters of tetrachlorophthalic acid and hexahydrophthalic acid, the esterifying alcohol being oleyl alcohol, and at least 2 percent by weight free triethanolamine in said aqueous solution.

5. A coolant for metal working machines consisting essentially of a major amount of water and from about 1% by weight to about 8% by weight of the triethanolamine salt of oleyl tetrachlorophthalate, from about 1% by weight to about 8% by weight of a triethanolamine salt of mono-oleyl hexahydrophthalate.

6. A coolant for metal working machines consisting essentially of a major amount of water and from about 1% by weight to about 8% by weight of the triethanolamine salt of mono-oleyl tetrachlorophthalate, from about 1% by weight to about 8% by weight of a triethanolamine salt of mono-oleyl hexahydrophthalate, up to about 25% by weight of triethanolamine.

7. A coolant for metal working machines consisting essentially of a major amount of water and about 5.6% by weight of the triethanolamine salt of mono-oleyl tetrachlorophthalate, about 4.8% by weight of a triethanolamine salt of mono-oleyl hexahydrophthalate, about 22% by weight of triethanolamine.

8. A coolant for metal working machines consisting essentially of a major amount of water and of from about 1% to about 15% by weight of the triethanolamine salt of mono-oleyl hexahydrophthalate.

References Cited in the file of this patent

UNITED STATES PATENTS

| | | |
|---|---|---|
| 2,372,955 | Johnston | Apr. 3, 1945 |
| 2,474,325 | Rogers et al. | June 28, 1949 |
| 2,617,820 | Gamrath et al. | Nov. 11, 1952 |
| 2,689,828 | Smith | Sept. 21, 1954 |
| 2,724,643 | Morris et al. | Nov. 22, 1955 |